United States Patent [19]

Chang et al.

[11] Patent Number: 4,622,369
[45] Date of Patent: Nov. 11, 1986

[54] URETHANE RESINS CONTAINING HYDROLYZABLE MOIETIES FROM ORGANOSILANE COMPOUNDS

[75] Inventors: Wen H. Chang; David T. McKeough, both of Gibsonia; Ronald R. Ambrose, Allison Park, all of Pa.

[73] Assignee: PPG Industries, Inc., Pittsburgh, Pa.

[21] Appl. No.: 728,967

[22] Filed: Apr. 30, 1985

[51] Int. Cl.$^4$ .............................................. C08F 20/00
[52] U.S. Cl. .................................. 525/440; 525/453; 525/460; 528/28; 528/26; 528/29; 528/27
[58] Field of Search ............... 528/28, 29, 26, 27; 525/440, 453, 460

[56] References Cited

U.S. PATENT DOCUMENTS

| | | | |
|---|---|---|---|
| 4,093,673 | 6/1978 | Chang et al. | 260/824 |
| 4,113,665 | 9/1978 | Law et al. | 528/29 |
| 4,191,713 | 4/1980 | Yonezawa et al. | 525/102 |
| 4,243,767 | 1/1981 | Kaufman et al. | 525/102 |
| 4,368,294 | 1/1983 | Deubzer et al. | 525/100 |
| 4,399,261 | 8/1983 | Kato et al. | 525/342 |
| 4,446,292 | 5/1984 | Chang et al. | 528/29 |
| 4,467,081 | 8/1984 | Chang et al. | 528/26 |
| 4,472,465 | 9/1984 | Burrill | 427/387 |
| 4,501,872 | 2/1985 | Chang et al. | 528/18 |

FOREIGN PATENT DOCUMENTS 126470 7/1984 Japan.

*Primary Examiner*—Melvyn I. Marquis
*Attorney, Agent, or Firm*—Thomas M. Breininger

[57] ABSTRACT

Disclosed is an ungelled urethane resin composition containing a urethane compound having in a molecule thereof at least one group containing a silicon atom selected from:

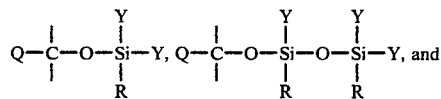
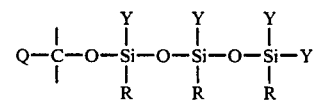

wherein

Q represents the residue from a urethane polyol; each R which may be the same or different, represents hydrogen or a $C_1$-$C_{10}$ group joined to Si through an Si-C linkage; and Y represents an easily hydrolyzable group.

The urethane resin composition contains an amount of easily hydrolyzable Y moieties such that the ratio of the number of grams of the ungelled urethane resin composition to equivalents of easily hydrolyzable Y moieties in the ungelled urethane resin composition is in a range of from 40 to 667. Preferred urethane resin compositions can be cured in the presence of atmospheric moisture and a suitable catalyst at a temperature of less than or equal to 121 degrees Celsius within 3 hours.

Disclosed is a method for producing the ungelled urethane resin composition.

Also disclosed is a nonaqueous composition, particularly a nonaqueous coating composition, containing an ungelled urethane resin composition. Preferred coating compositions containing an ungelled urethane resin composition can be cured in the presence of atmospheric moisture and a suitable catalyst at a temperature of less than or equal to 121 degrees Celsius.

29 Claims, No Drawings

URETHANE RESINS CONTAINING HYDROLYZABLE MOIETIES FROM ORGANOSILANE COMPOUNDS

BACKGROUND OF THE INVENTION

1. Field of Invention

This invention is directed to a curable urethane and to a composition, particularly a coating composition, containing a urethane which composition cures at low temperature, preferably ambient temperature, in the presence of moisture.

2. Some Objects of the Present Invention

There is a continuing need, particularly in the coatings industry, to provide compositions which have low curing temperatures and, preferably, which cure at ambient temperature. There is also a continuing need to provide compositions which contain ever lower concentrations of volatile organic components. Additionally, it would be desirable to provide compositions which do not depend on organic isocyanates for curing.

However, previous approaches to meet these challenges generally have involved disadvantageous compromises among desirable coating composition properties such as molecular weight of the principal film forming resin, application viscosity of the composition, low curing temperature, and desirable properties of the cured film such as water resistance, flexibility, hardness, solvent resistance, etc.

Objects of the present invention are to help meet these challenges. Additionally, an object of the present invention is to prepare new curing agents for organic polyols. Other objects of the invention will become apparent to the reader infra.

SUMMARY OF THE INVENTION

The present invention is for an ungelled urethane resin composition containing a urethane compound having in a molecule thereof at least one group containing a silicon atom, the aforesaid group being independently selected from:

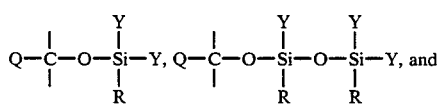

(I)

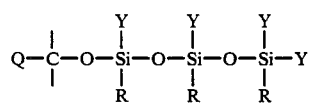

wherein

Q represents the residue from a urethane polyol; each R, which may be same or different, represents: hydrogen; or a $C_1$–$C_{10}$ group joined to Si through an Si–C linkage optionally containing a primary amino group, a secondary amino group, a tertiary amino group, a polyamino group, a mercapto group, a methacrylato group, an acrylato group, a urea group, a cyclic urea group, a urethane group, a 1,2-epoxy group, an ester group, an ether group, a thioether group, an amido group, an imidazolinyl group, a cyano group, an allyl group, a vinyl group, and/or a halo group; and Y represents an easily hydrolyzable group;
provided that the urethane resin composition contains an amount of easily hydrolyzable Y moieties directly bonded to silicon atoms such that the ratio of the number of grams of said ungelled urethane resin composition to equivalents of easily hydrolyzable Y moieties in the ungelled urethane resin composition is in a range of from 40 to 667.

In other words an ungelled urethane resin composition of the invention has a content, from whatever source, of easily hydrolyzable Y moieties bonded directly to silicon atoms, of from 25 milliequivalents per gram to 1.5 milliequivalents per gram of ungelled urethane resin composition. Preferred urethane resin compositions of the invention can be cured in the presence of atmospheric moisture and a suitable catalyst at a temperature of less than or equal to 121 degrees Celsius, °C., within 3 hours.

The present invention also is directed to methods for producing ungelled urethane resin compositions of the invention.

Additionally, the present invention is for a nonaqueous composition, particularly a nonaqueous coating composition, containing an ungelled urethane resin composition of the invention. Preferred coating compositions containing an ungelled urethane resin composition of the invention can be cured in the presence of atmospheric moisture and a suitable catalyst at a temperature of less than or equal to 121 degrees C. within 3 hours.

DETAILED DESCRIPTION OF THE INVENTION

A urethane resin composition of the present invention is ungelled and contains a urethane compound having in a molecule thereof at least one group containing a silicon atom which group is selected from:

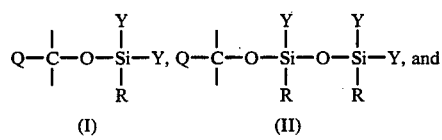

(I) (II)

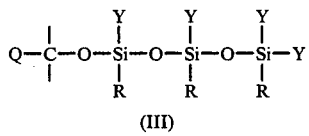

(III)

wherein

Q represents the residue from a urethane polyol; each R, which may be same or different, represents: hydrogen; or a $C_1$–$C_{10}$ group joined to Si through an Si–C linkage optionally containing a primary amino group, a secondary amino group, a tertiary amino group, a polyamino group, a mercapto group, a methacrylato group, an acrylato group, a urea group, a cyclic urea group, a urethane group, a 1,2-epoxy group, an ester group, an ether group, a thioether group, an amido group, an imidazolinyl group, a cyano group, an allyl group, a vinyl group, and/or a halo group; and Y represents an easily hydrolyzable group;
provided that the urethane resin composition contains an amount of easily hydrolyzable Y moieties such that the ratio of the number of grams of said ungelled urethane resin composition to equivalents of easily hydrolyzable Y moieties in the ungelled urethane resin composition is in a range of from 40 to 667, preferably in a range of from 40 to 400, and more preferably in a range of from 40 to 200. In other words, an ungelled urethane resin composition of the invention has a total content of easily hydrolyzable Y moieties of from 25 milliequivalents to 1.5 milliequivalents, preferably of from 25 to 2.5 milliequivalents, more preferably of from 25 to 5.0 milliequivalents, per gram of ungelled urethane resin composition.

In the aforesaid definition of R, it is to be understood that the $C_1$–$C_{10}$ group joined to Si through an Si–C linkage can be saturated or can contain aromatic and/or ethylenic unsaturation. It is preferred that for the moieties Y, that not all of these moieties are phenyl.

It is preferred that a hydrophobic urethane polyol be employed as urethane polyol for preparation of an ungelled urethane resin composition of the invention. The term "hydrophobic urethane polyol" is intended to mean a polyol containing at least one urethane group and having limited compatibility with water as determined by the following procedure. Thirty parts by weight of urethane polyol and 70 parts by weight of water are thoroughly mixed together at 80 degrees Celsius (degrees C.) for 5 minutes. Upon cooling to room temperature, if the urethane polyol/water mixture separates into two phases, the urethane polyol is considered herein to be a hydrophobic urethane polyol useful for the preparation of preferred ungelled urethane resin compositions of the invention.

As used herein, the term "ungelled" as applied to a urethane resin composition of the invention is understood to mean that the urethane resin composition is itself liquid at 25 degrees C. or is capable of being liquified in the presence of a suitable solvent at 25 degrees C. Preferred ungelled urethane resin compositions of the invention are those which are liquid at 25 degrees C. in the presence of suitable solvents.

Urethane resin compositions of the invention can be cured to a tack free state in the presence of atmospheric moisture and a suitable catalyst at a temperature of less than or equal to 121 degrees C. within 3 hours. Preferred urethane resin compositions of the invention can be cured to a tack free state in the presence of atmospheric moisture and a suitable catalyst at a temperature of 25 degrees C. within 24 hours. By "tack free" is meant that a film of the cured urethane resin composition having a thickness of about 1 mil (about 25 microns) will not feel sticky to the touch when pressed with a finger.

Examples of groups which can represent the easily hydrolyzable group Y include —OR$^1$,

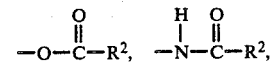

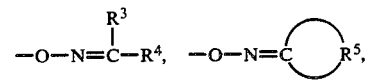

and the monohydroxy and/or cyclic $C_2$–$C_3$ residue of a 1,2- or 1,3-glycol, wherein $R^1$ represents a $C_1$–$C_3$ alkyl, preferably $C_1$–$C_2$ alkyl, and most preferably methyl, $R^2$ independently represents H or $C_1$–$C_4$ alkyl, $R^3$ and $R^4$ independently represent H, $C_1$–$C_4$ alkyl, $C_6$–$C_8$ aryl and $R^5$ represents $C_4$–$C_7$ alkylene.

Of the above examples of easily hydrolyzable groups Y, the groups

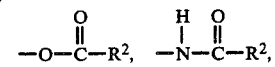

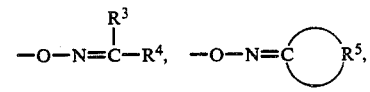

and the monohydroxy and/or cyclic $C_2$–$C_3$ residue of a 1,2- or 1,3-glycol, as defined above, are less preferred than the hydrolyzable group —OR$^1$ as defined above, the groups

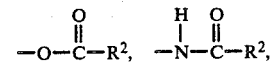

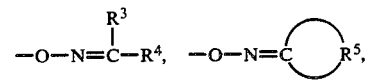

being much less preferred since they contribute to higher weight loss than desired for some applications when urethane resins of the invention containing these groups are cured; and their products upon cure tend to have lower vapor pressures than desired for some applications which may increase the curing times and/or temperatures of urethane resins of the invention containing these groups. Thus, these groups are less preferable than the aforesaid —OR$^1$ groups, particularly methoxy and ethoxy, where short curing times, low weight loss and low curing temperatures are important considerations.

In one preferred ungelled urethane resin composition at least one Y of the urethane resin represents —OR$^1$ wherein R$^1$ is a $C_1$–$C_2$ alkyl group. In one more preferred ungelled urethane resin composition at least one Y of the urethane resin is a methoxy group and at least one R is methyl or vinyl.

An ungelled urethane resin composition of the invention can be prepared, for example by reacting a urethane polyol with (a) an organosilicon-containing material containing at least 10 percent by weight of the organosilicon-containing material of a compound corresponding to the formula (VIII), R—Si(OR$^6$)$_3$ wherein R is as defined for formulas (I) through (III) above, and R$^6$ independently represents a $C_1$–$C_3$ alkyl group, preferably at least one OR$^6$ group being methoxy; (b) an organosilicon-containing material comprising at least 10 percent by weight of said organosilicon-containing material of a compound corresponding to the formula

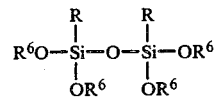
(IX)

wherein R is as defined for formulas (I) through (III) above, and R$^6$ independently represents a $C_1$–$C_3$ alkyl group, preferably at least one OR$^6$ group being methoxy; (c) an organosilicon-containing material comprising at least 10 percent by weight of said organosilicon-containing material of a compound corresponding to the formula

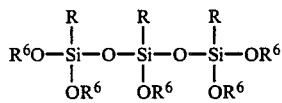

(X)

wherein R is as defined for formulas (I) through (III) above, and $R^6$ independently represents a $C_1$–$C_3$ alkyl group, preferably at least one $OR^6$ group being methoxy; (d) an organosilicon-containing material comprising a mixture containing at least 10 percent by weight of said organosilicon-containing material of a compound corresponding to the formula R—Si(OR$^6$)$_3$ and at least 10 percent by weight of said organosilicon-containing material of a compound corresponding to the formula

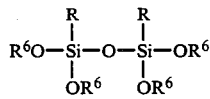

wherein R is as defined for formulas (I) through (III) above, and $R^6$ independently represents a $C_1$–$C_3$ alkyl group, preferably at least one $OR^6$ group being methoxy; or (e) a partial hydrolysis product of a compound corresponding to the formula R—Si(OR$^6$)$_3$ wherein R is as defined for formulas (I) through (III) above, and $R^6$ independently represents a $C_1$–$C_3$ alkyl group, preferably at least one $OR^6$ group being methoxy; and/or a combination thereof.

Examples of suitable organosilicon-containing materials for preparation of an ungelled urethane resin composition of the invention include but are not limited to the following (1) through (4).

(1) Suitable organosilicon-containing materials optionally can include organosilicates, including partial hydrolysis products thereof, such as organosilicates corresponding to the following formula (IV),

(IV)

wherein
  $R^6$ represents methyl, ethyl or propyl (thus $OR^6$ is a "lower alkoxy moiety"),
  $R^7$ represents alkyl containing at least 4 carbon atoms, aryl, alkylaryl, arylalkyl, aryloxyalkyl, or alkyloxyalkyl, and
  x is an integer ranging from 0 to 2, preferably 0 or 1, and most preferably 0.

Examples of useful organosilicates include: tetramethoxysilane, tetraethoxysilane, tetra-n-propoxysilane, methoxytriethoxysilane, dimethoxydiethoxysilane, trimethoxy-n-propoxysilane, bis(2-ethylhexoxy)diethoxysilane and the like. Mixtures of organosilicates also may be employed.

Of the organosilicates corresponding to the formula (IV), above, the tetraalkoxysilanes wherein x equals 0 in formula (IV) are preferred. The tetraalkoxysilanes provide a high degree of functionality to the urethane resin compositions of the invention and enhance the ease with which the compositions of the invention can be cured. Additionally, the tetraalkoxysilanes are readily available at low cost. Furthermore, they can be used to attach modifying groups such as those represented by —OR$^7$ in formula (IV) above, an example of which is a sec-butoxy group. Of the examples of organosilicates described above, tetramethoxysilane is desirable for some purposes because of the ease with which it reacts with the hydroxyl moiety of a urethane polyol. Tetraethoxysilane is also desirable since, although tetraethoxysilane is not as reactive as tetramethoxysilane, it is not as highly volatile as tetramethoxysilane.

Examples of organosilicates, other than the above organosilicates, which may be utilized in the invention include tetraacetoxysilane, diethoxydiacetoxysilane, and

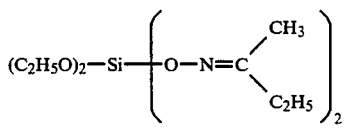

As stated previously, the partial hydrolysis products of the organosilicates can be used as organosilicon-containing material for preparation of an ungelled urethane resin composition of the invention. Hydrolyzed organosilicates provide increased reactive groups per molecule in the urethane polymers. Additionally, the hydrolyzed organosilicates can help provide low volatility to the urethane resin compositions of the invention.

In preparing a partial hydrolysis product, for example, from an organosilicate of formula (IV) above, a controlled amount of water is employed. Typically the hydrolysis product will be prepared utilizing a ratio of moles of the organosilicate to moles of water ranging from 1:0.75 to 1:0.4. A useful guide for determining the amount of water for preparing preferred partial hydrolysis products, where organosilicates are used, can be found in formula (XI) infra. The amount of unhydrolyzed organosilicate compound in the partial hydrolysis product typically is less than 50 percent by weight of the organosilicate compound based on the total weight of starting organosilicate compound. Moreover, the partial hydrolysis product typically will contain greater than 5.0, and usually greater than 8.0, milliequivalents of residual easily hydrolyzable groups per gram of the partial hydrolysis product.

It is often desired that organosilicates and/or partial hydrolysis products thereof containing higher alkoxy, aryloxy, arylalkyloxy, alkylaryloxy, alkyloxyalkyloxy, and/or aryloxyalkyloxy moieties attached to one or more silicon atoms in addition to the easily hydrolyzable moieties be employed for preparation of the urethane resin compositions of the invention. The term "higher alkoxy" is intended to mean an alkoxy group having at least 4 carbon atoms such as sec-butoxy, n-pentoxy, isopentoxy, neopentoxy, hexoxy, nonoxy, isodecyloxy and the like. Examples of aryloxy, arylalkyloxy, alkylaryloxy, alkyloxyalkyloxy and/or aryloxyalkyloxy moieties include phenoxy, benzyloxy, phenylethoxy, tolyloxy, xylyloxy, 4-ethylphenoxy, phenoxyethoxy, 2-butoxyethoxy and the like. It is believed that the presence of such higher alkoxy, aryloxy, arylalkyloxy, alkylaryloxy, alkyloxyalkyloxy and/or aryloxyalkyloxy moieties from the organosilicon-containing material provides enhanced hydrolytic stability to urethane resin compositions of the invention and enhanced hydrolytic stability to cured films prepared from the urethane resin compositions of the invention when prepared, for example, using such organosilicates in the organosilicon-containing material. However, when an ungelled urethane resin composition of the invention is prepared from an organosilicate (and/or partially hydrolyzed organosilicate) containing higher alkoxy, aryloxy, arylalkyloxy, alkylaryloxy, alkyloxyalkyloxy, and/or aryloxyalkyloxy moieties, the urethane resin composition should contain a residual amount of the easily hydrolyzable moieties from the organosilicon-containing material. Moreover, the presence of such $OR^7$ type groups in an ungelled urethane resin composition of the invention, can contribute to a slower rate of cure which may be desired for some applications. When an organosilicate is employed in the organosilicon-containing material together with an organosilane corresponding to formula (VI) infra, the product urethane resin composition generally will contain from 25 to 1.5 milliequivalents per gram of the urethane resin composition of the lower alkoxy moieties $-OR^6$.

(2) Suitable organosilicon-containing materials include nonfunctional organosilanes, including partial hydrolysis products thereof. As used herein, a nonfunctional organosilane is understood to mean a material corresponding to the formula, (VI),

 (VI)

wherein
$R^8$ represents hydrogen, alkyl, aryl alkylaryl, arylalkyl, or aryloxyalky;
X represents $-OR^1$,

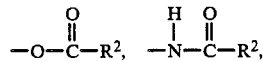

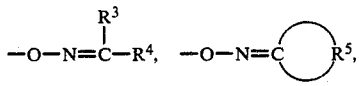

and the monohydroxy and/or cyclic $C_2$–$C_3$ residue of a 1,2- or 1,3-glycol, wherein
$R^1$ represents a $C_1$–$C_3$ alkyl, preferably $C_1$–$C_2$ alkyl, and most preferably methyl,
$R^2$ independently represents H or $C_1$–$C_4$ alkyl,
$R^3$ and $R^4$ independently represent H, $C_1$–$C_4$ alkyl, $C_6$–$C_8$ aryl and
$^5$ represents $C_4$–$C_7$ alkylene, and
m is an integer ranging from 1 to 2, preferably 1.

It should be understood that the term "nonfunctional organosilane" wherever appearing herein is used for convenience to distinguish compounds corresponding to the above formula, (VI) (and/or partial hydrolysis products thereof) from those compounds (and/or partial hydrolysis products thereof) referred to herein for convenience as functional organosilanes and corresponding to the formula (VII) infra. Thus, although moieties defined by X in formula (VI) are easily displaceable by reaction with water and/or alcohol and are, therefore, necessarily rather reactive, they are not defined herein as "functional" as this word is used in connection with the definition of a "functional organosilane" infra.

Partial hydrolysis products of nonfunctional organosilanes can be prepared in a manner similar to the preparation of partial hydrolysis products of organosilicates discussed above. In the preparation of a partial hydrolysis product of a nonfunctional organosilane a controlled amount of water is employed. Typically the hydrolysis product will be prepared utilizing a ratio of moles of the nonfunctional organosilane to moles of water ranging from 1:0.75 to 1:0.4. A useful guide for determining the amount of water for preparing preferred partial hydrolysis products, where desired from nonfunctional organosilanes, can be found in formula (XI) infra. The amount of unhydrolyzed nonfunctional organosilane in the partial hydrolysis product typically is less than 50 percent by weight of the nonfunctional organosilane compound based on the total weight of starting nonfunctional organosilane compound. Moreover, the partial hydrolysis product typically will contain greater than 5.0, and usually greater than 8.0, milliequivalents of residual easily hydrolyzable groups per gram of the partial hydrolysis product.

Typically, when a nonfunctional organosilane (and/or a partial hydrolysis product thereof) is utilized as organosilicon-containing material, a nonfunctional organosilane corresponding to formula (VI) in which X corresponds to $-OR^1$ as defined above is employed.

Examples of nonfunctional organosilanes corresponding to the above formula, (VI), include methyl trimethoxy silane (e.g., available from Union Carbide Corp. as A-163), dimethyl dimethoxy silane, methyl triethoxy silane, dimethyl diethoxy silane, dimethoxy diphenyl silane, dimethoxy methyl phenyl silane, diethoxy dipropyl silane, dimethoxy dipropyl silane, and the like. Additional examples of the nonfunctional organosilanes include amyl triethoxy silane and triethoxy silane. Compounds such as trimethyl methoxy silane, trimethyl ethoxy silane, and ethoxy tripropyl silane may be employed where desired in limited, controlled amounts for modification purposes.

The nonfunctional organosilanes (and/or partial hydrolysis products thereof) contribute to water resistance, toughness, and stain resistance of cured films prepared from compositions containing urethane resin compositions of the invention incorporating these nonfunctional organosilanes (and/or partial hydrolysis products thereof). Trialkoxysilanes corresponding to formula (VI) above (i.e., m equals 1 and X represents $-OR^1$) are preferred, those in which $R^8$ represents hydrogen, methyl, ethyl, or phenyl and $-OR^1$ represents methoxy or ethoxy being more preferred, and those in which $R^8$ represents methyl and $-OR^1$ represents methoxy being most preferred. Moreover, the dimethyl dialkoxy silanes corresponding to formula (VI) above are less desirable than the trialkoxy silanes since it is believed that the dimethyl dialkoxy silanes tend to decrease the adhesion to the substrate of cured films prepared from compositions of the inventions incorporating the dimethyl dialkoxy silanes.

As stated above, trialkoxy silanes corresponding to formula (VI) such as methyl trimethoxy silane (and/or partial hydrolysis products thereof) are especially preferred as organosilicon-containing material. Phenyl trialkoxy silane or trialkoxy silanes wherein $-R^8$ in formula (VI) is represented by an aliphatic group containing more than about 10 carbon atoms are less desirable than methyl trimethoxy silane since they tend to decrease the ease of curing of urethane resins of the invention and compositions of the invention containing such urethane resin compositions. However, phenyl trialkoxy silanes often help the weatherability of films when properly cured, for example at temperatures above about 250 degrees F. (121 degrees C.) in the presence of catalyst.

Where desired, a nonfunctional organosilane (and/or partial hydrolysis products thereof) containing higher alkoxy, aryloxy, alkylaryloxy, arylalkyloxy, alkyloxyalkyloxy, and/or aryloxyalkyloxy moieties as defined previously may be used as organosilicon-containing material. Organosilicon-containing materials containing such moieties may be prepared, for example, by reacting a nonfunctional organosilane such as methyl trimethoxy silane (and/or a partial hydrolysis product thereof) with a suitable monohydric alcoholic or monohydric phenolic material so as to provide higher alkoxy, aryloxy, alkylaryloxy, arylalkyloxy, alkyloxyalkyloxy, and/or aryloxyalkyloxy moieties to the nonfunctional organosilane. Examples of such organosilanes include: pentoxydimethoxymethylsilane, isopentoxydimethoxymethylsilane, 2-ethylhexoxydimethoxymethylsilane, 2-butoxyethoxydimethoxymethylsilane, diisodecyloxymethoxymethylsilane, phenoxydimethoxyphenylsilane, tolyloxydimethoxymethylsilane, phenylethyloxydimethoxymethylsilane, and the like. However, when a urethane resin composition of the invention is prepared from a nonfunctional organosilane (and/or partially hydrolyzed nonfunctional organosilane) containing higher alkoxy, aryloxy, arylalkyloxy, alkylaryloxy, alkyloxyalkyloxy, and/or aryloxyalkyloxy moieties, the urethane resin composition should contain a residual amount of the easily hydrolyzable moieties from the organosilicon-containing material. Moreover, the presence of such $OR^7$ type groups in a urethane resin composition of the invention can contribute to a slower rate of cure which may be desired for some applications.

(3) Suitable organosilicon-containing materials include functional organosilanes, including partial hydrolysis products thereof. As used herein, a "functional organosilane" is intended to include materials corresponding to the following formula, (VII), $$F-G-SiX_3, \qquad (VII)$$

wherein
G represents an organo group containing from 2 to 10 carbon atoms,
X represents $-OR^1$,

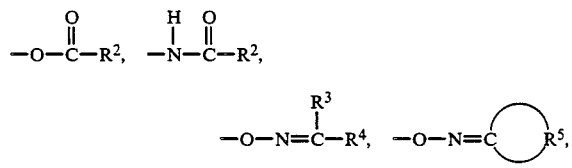

and the monohydroxy and/or cyclic $C_2$-$C_3$ residue of a 1,2- or 1,3-glycol, wherein
$R^1$ represents a $C_1$-$C_3$ alkyl, preferably $C_1$-$C_2$ alkyl, and most preferably methyl,
$R^2$ independently represents H or $C_1$-$C_4$ alkyl,
$R^3$ and $R^4$ independently represent H, $C_1$-$C_4$ alkyl, $C_6$-$C_8$ aryl and
$R^5$ represents $C_4$-$C_7$ alkylene, and
F represents amino, polyamino, 1,2-epoxy, mercapto, cyano, allyl, vinyl, urethano, halo, isocyanato, ureido, imidazolinyl, acrylato, methacrylato, or a group corresponding to $-SiX_3$, wherein X is as defined above.

In accordance with the discussion of the distinction between nonfunctional organosilanes and functional organosilanes as these terms are used herein, groups defined by F above are considered to be the "functional" groups encompassed by the term "functional organosilane." It also should be understood that compounds such as vinyl trimethoxy silane, vinyl triethoxy silane, allyl trimethoxy silane and allyl triethoxy silane, which contain functional groups such as allyl and vinyl, while not literally corresponding to formula (VII) above, are considered herein to fall within the meaning of functional organosilanes. Some examples of functional organosilanes include gamma-aminopropyltrimethoxysilane, gamma-aminopropyltriethoxysilane, beta-aminoethyltrimethoxysilane, beta-aminoethyltriethoxysilane, N-beta-aminoethylaminopropyltrimethoxysilane, gamma-isocyanatopropyltriethoxysilane, vinyl trimethoxy silane, vinyl triethoxy silane, allyl trimethoxy silane, allyl triethoxy silane, mercaptopropyltrimethoxysilane, mercaptoethyltrimethoxysilane, mercaptopropyltriethoxysilane, glycidoxypropyltrimethoxysilane, glycidoxypropyltriethoxysilane, 4,5-epoxycyclohexylethyltrimethoxysilane, ureidopropyltrimethoxysilane, ureidopropyltriethoxysilane, chloropropyltrimethoxysilane, chloropropyltriethoxysilane, and

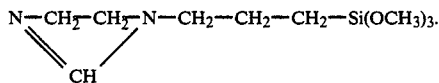

It will be appreciated that functional organosilanes containing mutually reactive functional groups such as 1,2-epoxy and amino, or amino and isocyanato, etc., or groups defined by F above which are reactive with groups defined by X above, should be employed in controlled amounts to prepare the urethane resin compositions of the invention so as to avoid gelation or products of undesirably high viscosity.

Although the incorporation of the functional organosilanes (and/or partial hydrolysis products thereof) in the organosilicon-containing material may be desirable for some purposes, functional organosilanes tend to be costly. It has been found that, where desired, cured compositions of the invention having excellent properties can be made from urethane resin compositions of the invention, which can be essentially self-curable in the presence of a suitable catalyst, prepared from the reaction of urethane polyols with organosilicon-containing materials in which the amount of such functional organosilanes is minimized or even eliminated. Of course, various urethane resin compositions of the invention prepared from functional organosilanes can be utilized, for example, as curing agents for materials containing groups reactive with the functional groups, F (see formula VII), present in such urethane resin compositions. Moreover, for some purposes, ungelled urethane resin compositions of the invention prepared from organosilicon-containing material containing a mixture of nonfunctional organosilane and amino-containing functional organosilane are desirable.

(4) It is to be understood that mixtures and/or partially hydrolyzed mixtures of (1) the optional organosilicates (and/or partial hydrolysis products thereof), and/or (2) the nonfunctional organosilanes (and/or partial hydrolysis products thereof), and/or (3) the functional organosilanes (and/or partial hydrolysis products thereof) may be employed as organosilicon-containing material for reaction with urethane polyols for preparation of ungelled urethane resin compositions of the invention.

In preparing a partial hydrolysis product, for example, from a nonfunctional organosilane of formula (VI) above, a controlled amount of water is utilized. Generally, the partial hydrolysis product will contain condensation product compounds having one or more siloxane linkages represented by the formula (V),

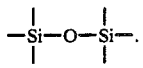

The hydrolysis and condensation reactions believed to be involved in the preparation of the ungelled partial hydrolysis products typically may be illustrated as follows:

[hydrolysis]
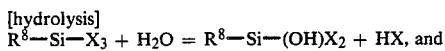

[condensation]
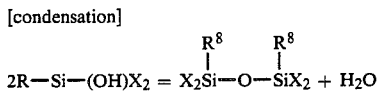

wherein $R^8$ and X are as defined in formula (VI) above, X being an easily hydrolyzable group such as, for example, methoxy or ethoxy.

In one preferred method for preparing an ungelled urethane resin composition of the invention, a urethane polyol is reacted with a partial hydrolysis product of an organosilicon-containing material containing a nonfunctional organosilane corresponding to formula (VI) above, such as methyl trimethoxy silane, optionally in combination with an organosilicate corresponding to formula (IV) above and/or a functional organosilane corresponding to formula (VII) above. The amount of water generally used for preparing the partially hydrolyzed organosilicon-containing material utilized for this preferred method can be determined according to the following formula (XI), $$(E_{1,2} \times 0.5) + (E_{3,4} \times Z) = W,$$

wherein
W represents the total moles of $H_2O$ employed calculated based on the total equivalents of the easily hydrolyzable groups from organosilane compounds such as organosilicates, nonfunctional organosilanes, and functional organosilanes, $E_{1,2}$ represents the total number of equivalents of easily hydrolyzable groups from organosilane compounds containing one or two easily hydrolyzable groups, $E_{3,4}$ represents the total number of equivalents of easily hydrolyzable groups from organosilane compounds containing three or four easily hydrolyzable groups, and Z is a number in the range of from 0.023 to 0.43, preferably in the range of from 0.050 to 0.33, and more preferably in the range of from 0.080 to 0.23.

It is to be understood that one equivalent of the hydrolyzable groups corresponds to one mole of the hydrolyzable groups, and one equivalent of water corresponds to ½ mole of water.

For example, just one useful mixture of organosilanes, suitable as organosilicon-containing material for preparation of a partial hydrolysis product, can contain methyl trimethoxy silane, phenyl trimethoxy silane, and methyl phenyl dimethoxy silane respectively in a molar ratio of 1.00 to 0.351 to 0.117. Such a mixture would provide 3.00 equivalents of methoxy groups from the methyl trimethoxy silane, 1.05 equivalents of methoxy groups from the phenyl trimethoxy silane, and 0.234 equivalents of methoxy groups from the methyl phenyl dimethoxy silane. Thus in formula (XI) above, $E_{1,2}$ would equal 0.234 and $E_{3,4}$ would equal 4.05; and assuming the maximum moles of water for preparation of the partial hydrolysis product according to formula (XI) (i.e., Z=0.43), the total moles of water for preparation of the partial hydrolysis product would equal 1.86 moles. Or, in other words, a maximum of 1.27 moles of water per mole of organosilane compound (i.e., 1.86 moles/1.468 moles equals 1.27).

Of course, it will be understood that the relative amounts of constituents in a partial hydrolysis product can be adjusted, for example by distilling off a portion, as desired, of volatile constituents from the partial hydrolysis product.

It will be appreciated from the disclosure herein, that the partial hydrolysis product prepared utilizing such a controlled amount of water as determined by formula (XI) above, will contain a mixture of low molecular weight compounds which contain residual easily hydrolyzable groups. The partial hydrolysis product typically will contain greater than 5.0, and usually greater than 8.0, milliequivalents of residual easily hydrolyzable groups per gram of partial hydrolysis product. There is also the possibility that the ungelled partial hydrolysis products prepared utilizing a controlled amount of water as determined from formula (XI) above, also contain a small amount of silanol-type ($\equiv$Si—OH) hydroxyl groups. However, such partial hydrolysis products generally will contain a ratio of residual easily hydrolyzable groups to silanol-type hydroxyl groups greater than 1.00, and typically greater than 3.00.

The partial hydrolysis of the organosilicon-containing material typically is conducted in the presence of from 0.01 to 20 percent by weight of a catalyst, which in some instances can function as a coreactant, examples of which catalyst include gamma-aminopropyl triethoxy silane, isophorone diamine, 2-amino-2-methyl-1-propanol, or the like. The percent by weight of catalyst is based on the total weight of the organosilicon-containing material. The preferred partial hydrolysis products typically contain an amount of easily hydrolyzable groups such that the ratio of the number of grams of the partial hydrolysis product to equivalents of the easily hydrolyzable groups in the partial hydrolysis product is in a range of from 40 to 300, usually in a range of from 50 to 200. In other words, the "hydrolyzable group equivalent weight" (alternatively referred to herein as "HGEW") of the partial hydrolysis product typically is in a range of from 40 to 300, usually in a range of from 50 to 200.

In one preferred embodiment of the invention, the ungelled urethane resin composition of the invention is prepared by reacting a urethane polyol with an organosilicon-containing material comprising at least 10 percent by weight of said organosilicon-containing material of a compound corresponding to the formula IX (a disiloxane) as defined above. Such an organosilicon-containing material can be prepared, for example, by the controlled hydrolysis of a trialkoxy silane compound corresponding to formula VIII above such as methyl trimethoxy silane employing a ratio of moles of the trialkoxy silane to moles of water ranging from 1.0:0.75 to 1.0:0.1, preferably ranging from 1.0:0.6 to 1.0:0.4. Such controlled hydrolysis will produce a hydrolysis product containing a mixture of compounds. The partial hydrolysis typically is conducted in the presence of from 0.01 to 20 percent by weight of a catalyst, which in some instances can function as a coreactant, examples of which catalyst include gamma-aminopropyltriethoxysilane, isophorone diamine, 2,2,4-trimethylhexamethylene-1,6-diamine, or 2,-amino-2-methyl-1-propanol. A preferred hydrolysis product produced from such controlled hydrolysis typically will contain at least 10 percent by weight of the disiloxane (see formula IX) in combination with at least 10 percent by weight of the starting compound (see formula VIII) in addition to other compounds such as the trisiloxane (see formula X).

In a second preferred embodiment of the invention, the ungelled urethane resin composition of the invention is prepared by reacting a urethane polyol with an organosilicon-containing material comprising the partial hydrolysis product of a mixture containing from 1 to 10 moles of methyl trimethoxy silane, from 10 to 1 moles of methyl phenyl dimethoxy silane and from 10 to 1 moles of phenyl trimethoxy silane. The partial hydrolysis typically is conducted in the presence of a catalyst and coreactant such as gamma-aminopropyltriethoxysilane, isophorone diamine, 2,2,4-trimethylhexamethylene-1,6-diamine or 2-amino-2-methyl-1-propanol. The partial hydrolysis is conducted employing a controlled amount of water, for example, from 0.75 to 0.1 mole of water per mole of alkoxy silane groups. It has been found that often such partial hydrolysis products of methyl trimethoxy silane, methyl phenyl dimethoxy silane, and phenyl trimethoxy silane are more compatible with hydroxyl-functional urethane resins than the partial hydrolysis product of methyl trimethoxy silane alone. Sometimes an alcohol such as methanol or ethanol is needed to render the partial hydrolysis product homogeneous.

As described above, a urethane resin composition of the invention can be prepared, for example, by reacting a urethane polyol with organosilicon-containing materials as described above. Typically the urethane polyol is a reaction product of an organic polyisocyanate with a polyol. Examples of polyols useful in the preparation of the urethane polyol include polyols in the broad classes including: (a) simple diols, triols, and higher hydric alcohols; (b) polyester polyols; (c) polyether polyols; (d) amide-containing polyols; and (e) acrylic polyols.

(a) The simple diols, triols, and higher hydric alcohols useful in the preparation of hydroxyl-functional urethane resins are generally known, examples of which include: ethylene glycol; propylene glycol; 1,2-butanediol; 1,4-butanediol; 1,3-butanediol; 2,2,4-trimethyl-1,3-pentanediol; 1,5-pentanediol; 2,4-pentanediol; 1,6-hexanediol; 2,5-hexanediol; 2-methyl-1,3-pentanediol; 2-methyl-2,4-pentanediol; 2,4-heptanediol; 2-ethyl-1,3-hexanediol; 2,2-dimethyl-1,3-propanediol; 1,4-cyclohexanediol; 1,4-cyclohexanedimethanol; 1,2-bis(hydroxymethyl)cyclohexane; 1,2-bis(hydroxyethyl)cyclohexane; 2,2-dimethyl-3-hydroxypropyl-2,2-dimethyl-3-hydroxypropionate; diethylene glycol; dipropylene glycol; bis hydroxypropyl hydantoins; tris hydroxyethyl isocyanurate; the alkoxylation product of 1 mole of 2,2-bis(4-hydroxyphenyl)propane (i.e., bisphenol-A) and 2 moles of propylene oxide available as DOW-565 from Dow Chemical Company; and the like.

(b) Polyester polyols useful in the preparation of hydroxyl-functional urethane resins are generally known and are prepared by conventional techniques utilizing simple diols, triols and higher hydric alcohols known in the art including but not limited to the previously described simple diols, triols, and higher hydric alcohols (optionally in combination with monohydric alcohols) with polycarboxylic acids. Examples of suitable polycarboxylic acids include: phthalic acid; isophthalic acid; terephthalic acid; trimellitic acid; tetrahydrophthalic acid, hexahydrophthalic acid; tetrachlorophthalic acid; adipic acid, azelaic acid, sebacic acid; succinic acid; malic acid; glutaric acid; malonic acid; pimelic acid; suberic acid; 2,2-dimethylsuccinic acid; 3,3-dimethylglutaric acid; 2,2-dimethylglutaric acid; maleic acid, fumaric acid, itaconic acid; and the like. Anhydrides of the above acids, where they exist, can also be employed and are encompassed by the term "polycarboxylic acid." In addition, certain materials which react in a manner similar to acids to form polyester polyols are also useful. Such materials include lactones such as caprolactone, propylolactone and methyl caprolactone, and hydroxy acids such as hydroxycaproic acid and dimethylolpropionic acid. If a triol or higher hydric alcohol is used, a monocarboxylic acid, such as acetic acid and benzoic acid, may be used in the preparation of the polyester polyol, and for some purposes, such a polyester polyol may be desirable. Moreover, polyester polyols useful for reaction with organosilicon-containing material are understood to include polyester polyols modified with fatty acids or glyceride oils of fatty acids (i.e., conventional alkyd polyols containing such modification). Another polyester polyol suitable for reaction with organosilicon-containing material is one prepared by reacting an alkylene oxide such as ethylene oxide, propylene oxide, butylglycidyl ether, and the glycidyl esters of organic acids such as CARDURA-E, with the carboxylic acid to form the corresponding ester.

Examples of the optional monohydric alcohols which may be used to prepare the polyester polyols include: ethanol, propanol, isopropanol, n-pentanol, neopentyl alcohol, 2-ethoxyethanol, 2-methoxyethanol, 1-hexanol, cyclohexanol, 2-methyl-2-hexanol, 2-ethylhexyl alcohol, 1-octanol, 2-octanol, 1-nonanol, 5-butyl-5-nonanol, isodecyl alcohol, and the like.

Alkyd polyols typically are produced by reacting polyhydric alcohols, polycarboxylic acids, and fatty acids derived from drying, semi-drying or non-drying oils in various proportions depending upon the extent of hydroxyl functionality and properties desired in the alkyd polyol. The techniques of preparing such alkyd polyols are well known generally. Usually, the process involves reacting together the polycarboxylic acid and fatty acid or partial glyceride thereof and the polyhydric alcohol (the latter usually in stoichiometric excess) in the presence of a catalyst such as litharge, sulfuric acid, or sulfonic acid to effect esterification with evolution of water. Examples of polyhydric alcohols typically used for preparation of the alkyl polyols include the simple diols, triols and higher hydric alcohols known in the art including but not limited to the previously described simple diols, triols, and higher hydric alcohols. Examples of polycarboxylic acids suitable for preparation of the alkyd polyols include those set forth previously in the description of polycarboxylic acids useful for preparing polyester polyols. Examples of suitable fatty acids include saturated and unsaturated acids such as stearic acid, oleic acid, ricinoleic acid, palmitic acid, linoleic acid, linolenic acid, licanic acid, elaeostearic acid, clupanodonic acid and mixtures thereof. The fatty acids may be in the form of the free acids with sufficient excess of the polyhdric alcohol being incorporated into the esterification mixture to compensate for their inclusion. However, in many instances, glyceride oils may be employed which have been partially alcoholized with sufficient amount of a polyhydric alcohol such as glycerol to supply the requisite amount of available hydroxyls for formation of the alkyd polyol.

(c) Polyether polyols are generally known. Examples of polyether polyols include the poly-(oxyethylene) glycols and poly-(oxypropylene) glycols prepared by the acid or base catalyzed addition of ethylene oxide or propylene oxide to initiators such as ethylene glycol, propylene glycol, diethylene glycol and dipropylene glycol and by the copolymerization of ethylene oxide and propylene oxide with initiator compounds such as trimethylolpropane, glycerol, pentaerythritol, sorbitol, sucrose and the like. Examples of polyether polyols also include the generally known poly-(oxytetramethylene) glycols prepared by the polymerization of tetrahydrofuran in the presence of Lewis acid catalysts such as boron trifluoride, tin (IV) chloride, antimony pentachloride, antimonytrichloride, phosphorous pentafluoride, and sulfonyl chloride. Other examples of polyether polyols include the generally known reaction products of 1,2-epoxide-containing compounds with polyols such as those included in the description of simple diols, triols, and higher hydric alcohols above.

(d) Amide-containing polyols are generally known and typically are prepared from any of the above-described diacids or lactones and diols, triols and higher alcohols, and diamines or aminoalcohols as illustrated, for example, by the reaction of neopentyl glycol, adipic acid and hexamethylenediamine. The amide-containing polyols also may be prepared through aminolysis by the reaction, for example, of carboxylates, carboxylic acids, or lactones with aminoalcohols. Examples of suitable diamines and aminoalcohols include hexamethylenediamine, ethylenediamine, phenylenediamines, toluenediamines, monoethanolamine, diethanolamine, N-methyl-monoethanolamine, isophorone diamine, 1,8-menthanediamine and the like.

(e) Acrylic polyols include but are not limited to the known hydroxyl-functional addition polymers and copolymers of acrylic and methacrylic acids and their ester derivatives including but not limited to their hydroxyl functional ester derivatives, acrylamide and methacrylamide, and unsaturated nitriles such as acrylonitrile and methacrylonitrile. Additional examples of acrylic monomers which can be addition polymerized to form acrylic polyols include hydroxyethyl (meth)acrylate, hydroxypropyl (meth)acrylate, methyl (meth)acrylate, ethyl (meth)acrylate, propyl (meth)acrylate, isopropyl (meth)acrylate, butyl (meth)acrylate, t-butyl (meth)acrylate, 2-ethylhexyl (meth)acrylate, n-hexyl (meth)acrylate, cyclohexyl (meth)acrylate, 3,3,5-trimethylcyclohexyl (meth)acrylate, decyl (meth)acrylate, isodecyl (meth)acrylate, lauryl (meth)acrylate, stearyl (meth)acrylate, phenyl (meth)acrylate, and isobornyl (meth)acrylate.

Where desired, various other unsaturated monomers can be employed in the preparation of hydroxyl-functional acrylic resins, examples of which include: vinyl aromatic hydrocarbons such as styrene, alpha-methyl styrene, and vinyl toluene; vinyl acetate; vinyl chloride; and unsaturated epoxy functional monomers such as glycidyl (meth)acrylate. For convenience, the term "(meth)acrylate" has been used herein to denote either or both of the respective acrylate compound and the respective methacrylate compound.

The polyisocyanate which is reacted with the polyol to form the urethane polyol can be any organic polyisocyanate. The polyisocyanate may be aromatic, aliphatic, cycloaliphatic, or heterocyclic and may be unsubstituted or substituted with groups such as halogen, etc. Many such organic polyisocyanates are known, examples of which include: toluene-2,4-diisocyanate, toluene-2,6-diisocyanate, and mixtures thereof; diphenylmethane-4,4'-diisocyanate, diphenylmethane-2,4'-diisocyanate and mixtures thereof; para-phenylene diisocyanate; biphenyl diisocyanate; 3,3'-dimethyl-4,4'-diphenylene diisocyanate; tetramethylene-1,4-diisocyanate; hexamethylene-1,6-diisocyanate; 2,2,4-trimethylhexane-1,6-diisocyanate; lysine methyl ester diisocyanate; bis(isocyanatoethyl)fumarate; isophorone diisocyanate; ethylene diisocyanate; dodecane-1,12-diisocyanate; cyclobutane-1,3-diisocyanate; cyclohexane-1,3-diisocyanate, cyclohexane-1,4-diisocyanate and mixtures thereof; methylcyclohexyl diisocyanate; hexahydrotoluene-2,4-diisocyanate, hexahydrotoluene-2,6-diisocyanate and mixtures thereof; hexahydrophenylene-1,3-diisocyanate, hexahydrophenylene-1,4-diisocyanate and mixtures thereof; perhydrodiphenylmethane-2,4'-diisocyanate, perhydro-diphenylmethane-4,4'-diisocyanate and mixtures thereof. It is to be understood that mixtures of polyisocyanates and monoisocyanates may be utilized as the polyisocyanate for preparing the urethane polyols. The urethane polyol usually is free of unreacted isocyanate.

Suitable urethane polyols for preparation of ungelled urethane resin compositions of the invention have a weight average molecular weight determined by gel permeation chromatography using a polystyrene standard of from 200 to 50,000. Moreover, suitable urethane polyols for preparation of the ungelled urethane resin compositions of the invention have a hydroxyl equivalent weight of from 74 to 1,000.

The above examples of urethane polyols should be considered to be merely illustrative of urethane polyols which may be utilized for preparation of ungelled urethane resin compositions of the invention.

When an ungelled urethane resin composition of the invention is prepared by reaction of a urethane polyol and an organosilicon-containing material as described above, the urethane polyol and the organosilicon-containing material are reacted typically under a blanket of a nonreactive gas such as nitrogen at a temperature ranging from about 50 degrees C. to about 180 degrees C. for 0.5 to 50 hours usually with removal by distillation of the low boiling volatile reaction product such as the volatile alcohol. If distillate is removed, a fractionating column may be used as a precaution to prevent removal of the starting materials. Depending on the vapor pressures of the starting materials, for example where materials having high vapor pressures are employed, often the reaction is conducted under pressure.

Often the starting materials do not form a homogeneous mixture at ambient temperature to begin with; however, as the reaction is carried out, the materials usually form a homogeneous mixture as the reaction proceeds. Moreover, materials such as gamma-glycidoxypropyl trimethoxy silane, QP8-5314 (a mixture believed to contain 25 mole percent methylphenyldimethoxysilane and 75 mole percent phenyltrimethoxysilane, available from Dow Corning Corp.), and n-methylpyrrolidone can be utilized in the reaction mixture to aid in rendering the starting materials compatible.

Depending on the choice of reactants and optionally catalysts, the reaction may be conducted under milder or more severe conditions of time and temperature. For example, the reaction may be conducted at a temperature such as 80 degrees C. for about 1 hour with removal of alcohol. Or where the reaction is carried out without a catalyst, the reaction may be conducted, for example, at 175 degrees C. for 3 or more hours. The presence of a catalytic amount of catalyst such as stannous octoate facilitates removal of volatile alcohol. Typically, a solvent is not included in the reaction medium. However, a limited amount of solvent may be desired particularly, for example, where the product is to be used as essentially the only film forming component in a coating composition or where the product is to be used in a high solids coating composition.

Ungelled urethane resin compositions of the invention are suitable for utilization in low solids and high solids coating applications. A high solids coating composition as defined herein typically contains at least 50 percent, preferably at least 60 percent, and most preferably at least 70 percent, by weight resin solids based on the weight of that portion of the composition including the reaction product (i.e., urethane resin composition) and organic solvent but excluding the weight of pigments, fillers and the like which may be present in the coating composition. However, where desired, solvents which are compatible with the reactants can be employed. Moreover, the product may be thinned with solvent. Examples of such solvents include conventional ketones such as methyl ethyl ketone, hydrocarbons such as xylene and toluene, the mono- and dialkylethers of diethylene glycol such as diethylene glycol dibutyl ether and diethylene glycol diethyl ether and low molecular weight alcohols such as methanol and ethanol. Moreover, it has been found that low molecular weight alcohols such as methanol and ethanol can be utilized to enhance the stability of ungelled urethane resin compositions of the invention. When desired, a limited amount of water can be employed to hydrolyze an unhydrolyzed organosilicon-containing material prior to, during, or even after reaction of the organosilicon-containing material with the urethane polyol.

Where water is employed in the reaction mixture, the amount of water must be controlled because water is a reactant in the reaction mixture. Moreover, when water is present as a separate phase, a water soluble solvent is often used to make the mixture homogeneous. Additionally, a moisture-free atmosphere usually is employed because uncontrolled hydrolysis of the organosilicon-containing material during product preparation is not desired and also in order to minimize the water content in the ungelled urethane resin product.

Depending on the particular choice of reactants, the reaction between the organosilicon-containing material and urethane polyol may be sluggish, and where desired, a catalyst may be utilized to speed up the reaction. Examples of such catalysts include: acids such as paratoluenesulfonic acid; tin-containing compounds such as butylstannoic acid, dibutyl tin oxide, stannous octoate and dibutyl tin dilaurate; titanates such as tetraisopropyltitanate and tetrabutyltitanate; amino compounds such as aminopropyltriethoxysilane, isopropanol amine, 2-amino-2-methyl-1-propanol, isophorone diamine, 2,2,4-trimethyl hexamethylene diamine, and the like. Of course, where functional organosilanes as described previously herein are employed for organosilicon-containing material, the choice of catalyst will be in part governed by the functional groups present so as to avoid gelation. Moreover, the extent of reaction should be controlled so as to avoid gelation. The extent of reaction can be monitored by following the amount of product HY given off during the reaction. When catalysts are utilized in the preparation of the urethane resin compositions of the invention, reaction temperatures lower than about 120 degrees C. are feasible.

When an ungelled urethane resin composition of the invention is prepared from the reaction of an organosilicon-containing material as described above and a urethane polyol, the amounts by weight of the organosilicon-containing material and the urethane polyol for preparation of the ungelled urethane resin composition may vary. Depending on the particular choice of urethane polyol and organosilicon-containing material, the mole ratio of hydroxyl moieties (i.e., C—OH) from the urethane polyol to hydroxyl-reactive Y moieties, for example, such as lower alkoxy moieties, from the organosilicon-containing material may vary. However, an amount of urethane polyol and an amount of organosilicon-containing material generally will be chosen and the extent of reaction controlled such that the ungelled urethane resin composition will contain an amount of the Y moieties such that the ratio of the number of grams of ungelled urethane resin composition to equivalents of the Y moieties in the ungelled urethane resin composition is in a range of from 40 to 667, preferably in a range of from 40 to 400, and more preferably in a range of from 40 to 200. A useful guide is to choose the urethane polyol and organosilicon-containing starting materials so as to provide a ratio of equivalents of hydroxyl moieties from the urethane polyol to equivalents of hydroxyl-reactive Y moieties, such as lower alkoxy moieties, from the organosilicon-containing material ranging from 1:2 to 1:100. Typically a ratio of equivalents of 1:3 to 1:20 is employed. Where desired, unreacted organosilicon-containing material can be removed by distillation. It will be understood that 1 equivalent of hydroxyl moieties equals 1 mole of hydroxyl moieties and 1 equivalent of the reactive Y moieties equals 1 mole of the hydroxyl-reactive Y moieties. An ungelled urethane resin composition of the invention will contain a total content of Y moieties of from 25 to 1.5 milliequivalents, preferably of from 25 to 2.5 milliequivalents, more preferably of from 25 to 5.0 milliequivalents, per gram of ungelled urethane resin composition. Moreover, typically the content of hydroxyl moieties (i.e., C—OH) in the ungelled urethane resin reaction product from the urethane polyol will range from 0 milliequivalents to 10 milliequivalents per gram of reaction product, usually from 0 to 5 milliequivalents per gram of reaction product. As used herein, one milliequivalent of either the hydroxyl moiety (i.e., C—OH) or the moiety Y bonded to Si is equal to one millimole of the functional group.

Most of the ungelled urethane resin compositions of the invention are storage stable for periods of at least 3 months, preferably for one year in airtight containers so as to prevent the introduction of moisture into the composition containing the ungelled urethane resin composition. Where desired, they may be stored under dry nitrogen. Also, product compatible materials which easily hydrolyze so as to act as scavengers for water may be combined with the composition. Examples of such easily hydrolyzable product compatible materials include organosilicates, organosilanes, or materials such as ethylorthoformate and 2,2-dimethoxy propane. Water-scavenging amounts of organosilicates or organosilanes can be incorporated with the product either by combining them with the urethane resin composition of the invention after the urethane resin composition is prepared or by employing an excess of organosilicon-containing material during the reaction of this material with the urethane polyol. To those that are not as stable as desired, such as some prepared using a catalyst, the ungelled urethane resin compositions of the invention can be stabilized by using trace amounts of compounds which act as inhibitors such as boron trifluoride etherate (a 1 to 1 mole ratio of boron trifluoride in diethyl ether). Moreover, as discussed previously herein, low molecular weight alcohols such as methanol and ethanol can be utilized to enhance the stability of the ungelled urethane resin compositions.

The ungelled urethane resin compositions of the invention advantageously may be utilized, typically in the presence of a catalyst, as essentially a sole film former for coating various substrates such as metal, paper, wood, wood furniture, hardboard, plastics, glass, and the like. Compositions based on urethane resin compositions of the invention can provide automotive quality coatings for both original equipment manufacture and automotive refinishing applications which can be cured at low temperatures (less than 180 degrees F., 82.2 degrees C.). Preferred compositions based on urethane resin compositions of the invention for automotive refinishing applications can be cured at ambient temperature (e.g., 25 degrees C.) in the presence of atmospheric moisture.

Examples of catalysts which may be used to promote the cure of compositions containing ungelled urethane resin compositions of the invention include: salts such as tin naphthenate, tin benzoate, tin octoate, tin butyrate, dibutyltin dilaurate, dibutyltin diacetate, iron stearate and lead octoate; titanates such as tetraisopropyl titanate and tetrabutyl titanate; oxides such as dibutyltin oxide; and bases such as isophorone diamine, methylene dianiline, imidazole, gamma-aminopropyl triethoxy silane, aminoalcohols such as 2-amino-2-methyl-1-propanol and other basic nitrogen-containing compounds.

Compositions containing ungelled urethane resin compositions of the invention can contain organic solvents, examples of which include: alcohols, such as methanol, ethanol, propanol, butanol and the like; the mono- and dialkyl ethers of ethylene and propylene glycol such as ethylene glycol monoethyl ether, ethylene glycol monobutyl ether, ethylene glycol dibutyl ether, ethylene glycol monoethyl ether acetate, ethylene glycol monohexyl ether acetate, propylene glycol monoethyl ether and propylene glycol dibutyl ether; the mono- and dialkyl ethers of diethylene glycol such as diethylene glycol monoethyl ether, diethylene glycol dibutyl ether, diethylene glycol diethyl ether and diethylene glycol monobutyl ether acetate; ketones such as methylethyl ketone; esters such as butyl-acetate; hydrocarbons such as xylene and toluene; N-methyl-2-pyrrolidone; dimethyl formamide; and mixtures thereof.

Coating compositions utilizing urethane resin compositions of the invention may be applied to substrates using any suitable technique such as brushing, dipping, spraying, roll coating, doctor blade coating, curtain coating, etc.

Compositions based on urethane resin compositions of the invention may be pigmented or unpigmented and may be utilized in the presence of various generally known additives such as flow control agents, surfactants, leveling agents, anti-mar agents, fungicides, mildewcides, and the like. Examples of pigments include any of the generally known pigments including extender pigments used in the coatings and resins industry such as titanium dioxide, magnesium carbonate, dolomite, talc, zinc oxide, magnesium oxide, iron oxides red and black, barium yellow, carbon black, strontium chromate, lead chromate, molybdate red, chromoxide green, cobalt blue, organic pigments of the azo series, metallic flake pigments such as aluminum flakes and nickel flakes, etc. Mixtures of pigments also may be employed.

Additionally, urethane resin compositions of the invention can be utilized as curing agents, in addition to or in substitution for generally known curing agents, for organic polyols generally known for use in coating compositions, examples of which polyols include but are not limited to simple diols, triols and higher hydric alcohols; acrylic polyols; polyurethane polyols; polyester polyols; polyether polyols; amide-containing polyols; polyhydroxyl-functional epoxy resins; polyhydric polyvinyl alcohols; etc.

The ungelled urethane resin compositions of the invention also may be utilized as additives to modify the properties of generally known coating compositions compatible with additive amounts of the urethane resin compositions. For example, the urethane resin compositions of the invention may be incorporated in additive amounts to modify such coating compositions properties as rheological properties such as viscosity, surface tension, flow, leveling, etc. An "additive amount" is understood herein to mean an amount of up to about 5 percent by weight based on the weight of resin solids in the coating composition (i.e., excluding pigments and solid fillers).

The ungelled urethane resin compositions of the invention also may be utilized in adhesives, sealants, inks, etc.

The following examples illustrate the invention and are not to be construed as limiting it to their details. As used herein, "pbw" means "parts by weight". All parts and percentages in the examples and throughout the specification are by weight unless specifically indicated otherwise.

EXAMPLE 1

(a) Preparation Of A Partially Hydrolyzed Organosilane

To a flask equipped with addition funnel, reflux condenser, thermometer, heater, stirrer and nitrogen inlet is charged at room temperature (about 24 degrees C.) under a blanket of nitrogen, 25,855.0 grams (g; 190.0 moles) of methyltrimethoxysilane (obtained as A-163 from Union Carbide Corp.) and 261.4 g (1.182 moles) of gamma-aminopropyltriethoxysilane (obtained as A-1100 from Union Carbide Corp.). Next, the contents of the flask are slowly heated over a period of 30 minutes to 50 degrees Celsius (degrees C.) at which point the slow addition of deionized water to the contents of the flask is begun. While the contents of the flask are stirred, a total of 1883.0 g (104.6 moles) of deionized water is added to the flask over a period of 75 minutes while the temperature of the contents of the flask (pot temperature) is maintained in the range of from 50 to 58 degrees C. Immediately after the addition of the water is completed, the contents of the flask are heated to reflux over a period of 17 minutes at the end of which period the pot temperature is 67 degrees C. Reflux is continued for about 3 hours and 8 minutes while the pot temperature is maintained in the range of from 64 to 68 degrees C. after which period heating is discontinued and the contents of the flask allowed to cool to ambient temperature. The resulting composition is a partially hydrolyzed organosilane.

(b) Preparation Of A Polyurethane Polyol

A reaction vessel equipped with addition funnel, reflux condenser, thermometer, dropping funnel, heater, stirrer and means for maintaining a nitrogen blanket is charged at room temperature with 1626 g cyclohexane dimethanol and 0.4 g of dibutyl tin dilaurate and heated to a temperature of 64 degrees C. Next 1581 g of trimethylhexamethylene diisocyanate is slowly added to the vessel over a period of 3 hours and 54 minutes while the temperature of the contents of the vessel is maintained in a range of 47 to 66 degrees C. Thereafter, the temperature is allowed to rise over a period of 20 minutes to 100 degrees C. Thereafter, the temperature of the contents of the vessel is reduced gradually to room temperature. The resulting product is a polyurethane polyol composition. Analysis of the resulting product shows no residual free isocyanate content.

(c) Preparation Of Ungelled Urethane Resin Composition By Reacting A Polyurethane Polyol With Partially Hydrolyzed Organosilane A reaction vessel equipped with thermometer and means for maintaining a nitrogen blanket is charged at room temperature with 200 g of the polyurethane polyol composition of part (b) immediately above, 300 g of the partially hydrolyzed organosilane of part (a) immediately above and 0.25 of dibutyl tin dilaurate. The contents of the vessel are heated over a period of 1 hour and 45 minutes to a temperature of 88 degrees C. at which temperature the contents of the vessel are observed to be homogeneous. Heating is discontinued and the contents of the vessel allowed to cool to ambient temperature overnight. Thereafter, the contents of the vessel are heated over a period of 29 minutes to 149 degrees C. at which point a total of 126.2 g of volatile material has been given off. Thereafter, the contents of the vessel are maintained for 5 hours in a temperature range of from 141 to 150 degrees C. at the end of which period a total of 141.8 g of volatile material has been given off (i.e., including the volatile material given off in the preceding period). Thereafter, the contents of the vessel are allowed to cool to room temperature.

The resulting product is an ungelled urethane resin composition of the invention. The ungelled urethane resin composition has a Gardner-Holdt viscosity of Z7, an acid value of 0, a Gardner color value of 4 and a percent by weight total solids content measured at 110 degrees C. for 1 hour of 94.4 percent.

(d) Preparation Of A Partially Hydrolyzed Organosilane

To a flask equipped with addition funnel, reflux condenser, thermometer, heater, stirrer and means for maintaining a nitrogen blanket is charged at room temperature under a blanket of nitrogen 2346.2 g of methyl trimethoxy silane and 23.7 g of gamma-aminopropyltriethoxysilane. Next, the contents of the flask are heated over a period of 15 minutes to a temperature of 50 degrees C. at which point the slow addition of deionized water to the contents of the flask is begun. While the contents of the flask are stirred, a total of 171 g of deionized water is added over a period of 48 minutes. The contents of the flask are heated over 25 minutes to reflux and thereafter held at reflux for 3 hours and 5 minutes while the pot temperature ranges from 66 to 68 degrees C. Thereafter, heating is discontinued and the contents of the flask are allowed to cool over a period of 50 minutes to 55 degrees C. at which temperature 634.4 g of gamma-aminopropyltriethoxysilane is added to the flask. The contents of the flask are allowed to cool further to 50 degrees C. whereupon the addition of the diglycidyl ether of hydrogenated bisphenol-A is begun. A total of 634.4 g of the diglycidyl ether of hydrogenated bisphenol-A is added to the flask over a period of 1 hour while the pot temperature ranges between 50 and 58 degrees C. Next, the contents are heated to reflux over the next 15 minutes and held at reflux for 2½ hours while the pot temperature is maintained at 68 degrees C. Thereafter, heating is discontinued, and the contents of the flask are allowed to cool to ambient temperature overnight. Next the contents are heated over a period of 25 minutes to 56 degrees C. whereupon 190.4 g of gamma-glycidoxypropyl trimethoxy silane is added to the flask. Over the next 15 minutes the temperature is raised to 60 degrees C. and thereafter held at 60 degrees C. for 3 hours after which the contents of the flask are allowed to cool to room temperature.

The resulting product contains a partially hydrolyzed organosilane. The resulting partially hydrolyzed organosilane has a No. 2 Shell Cup viscosity of 21.3 seconds at room temperature, a Gardner color value of 1, an epoxy equivalent weight of infinity, an amine equivalent weight of 1499.2, and has a total solids content measured for 1 hour at 110 degrees C. of 46.8 percent by weight.

(e) Coating Composition Using Ungelled Urethane Resin

A coating composition is prepared by mixing 53 g of the ungelled urethane resin of part (c) above with 58.8 g of the partially hydrolyzed organosilane of part (d) above and 2.0 g of dibutyl tin dilaurate. Samples of the coating composition are applied using a No. 60 wire wound bar over two, primed, BONDERITE-40 treated, steel panels. One of the resulting coatings is cured for 30 minutes at 121 degrees C. and the other is cured for about 24 hours at room temperature.

The coating cured for 30 minutes at 121 degrees C. has a 20 degree gloss of 76 and excellent distinctness of image (DOI) as determined visually; exhibits good mar resistance when scratched by a fingernail; and has a Sward hardness of 26.

The coating cured for about 24 hours at room temperature exhibits a 20 degree gloss of 80 and good DOI as determined visually; has a Sward hardness of 16; exhibits good mar resistance when scratched by a fingernail; and exhibits good solvent resistance. Solvent resistance is measured by applying back and forth finger rubs ("double rubs") to the cured coating with a cloth soaked in methylethyl ketone and determining the number of double rubs achieved before the coating is rubbed off down to the substrate. This coating cured for 24 hours at room temperature withstands greater than 100 double rubs using methylethyl ketone.

EXAMPLE 2

(a) Preparation Of A Polyester Polyol

A reaction vessel equipped for distillation and a nitrogen sparge, and with a thermometer and a stirrer, is charged with 1433.5 g of hexahydrophthalic anhydride, 1098.4 g of 1,6-hexane diol, 968.1 g of neopentyl glycol, 1.75 g of butylstannoic acid and 1.75 g of triphenylphosphite. The contents of the vessel are heated to a pot temperature of 181 degrees C. (head temperature of 80 degrees C.) at which temperature distillation is observed. The pot temperature is slowly raised over 7 hours and 10 minutes to 200 degrees C. (head temperature of 57 degrees C.) at which time a total amount of distillate of 140 milliliters (having an acid value of 16.1) is observed in the receiver for distillate. Heating is discontinued and the contents of the flask are allowed to cool overnight to ambient temperature. Thereafter, the contents of the flask are heated over a period of 2 hours and 25 minutes to a temperature of 200 degrees C. (head temperature of 45 degrees C.). The temperature is maintained at between 198 and 200 degrees C. for 1 hour and 50 minutes during which time the acid value drops to 10.3 and an additional 5 milliliters of distillate is collected. Thereafter, the contents of the flask are allowed to cool to ambient temperature.

The resulting product is a polyester polyol composition having a Gardner-Holdt bubble tube viscosity of between Z3 and Z4.

(b) Preparation Of A Polyester-Polyurethane Polyol

A reaction flask equipped with heating mantle, stirrer and means for maintaining a blanket of nitrogen is charged with 2250 g of the polyester polyol composition of part (a) immediately above, 750 g of trimethylhexamethylene diisocyanate, 3 g of a 0.01 percent by weight solution of dibutyl tin dilaurate in methyl isobutyl ketone and 750.1 g of methyl isobutyl ketone. Under a blanket of nitrogen, the contents of the flask are heated within 15 minutes to 94 degrees C. and 10 minutes thereafter when the temperature is 90 degrees C., heating is discontinued and the contents of the flask allowed to cool to ambient temperature. An infrared analysis of the resulting product shows no residual free isocyanate.

The resulting product is a polyester-polyurethane polyol. The polyester-polyurethane polyol has a number average molecular weight of 951 and a weight average molecular weight 2832 as determined by gel permeation chromatography using a polystyrene standard. The polyester-polyurethane polyol product has an acid value of 5.9, a hydroxyl value of 84.7, a viscosity of 43.1 Stokes, a Gardner color value of 1, and a total solids content measured for 1 hour at 110 degrees C. of 78.4 percent by weight.

(c) Preparation Of An Ungelled Urethane Resin Of The Invention

A reaction vessel equipped with stirrer, thermometer distillation head, and means for maintaining a nitrogen blanket is charged under a blanket of nitrogen with 1293.1 g of the polyester-polyurethane polyol of part (b) immediately above, 344.8 g of methyl trimethoxy silane, 344.8 g of QP8-5314 (a mixture believed to contain 25 mole percent methylphenyldimethoxysilane and 75 mole percent phenyltrimethoxysilane, available from Dow Corning Corp.) and 17.2 g of gamma-aminopropyl triethoxy silane and heated over a period of 40 minutes to a pot temperature of 92 degrees C. (head temperature of 59 degrees C.) at which time distillation is observed to begin. Thereafter, the pot temperature is maintained in a range of between 92 and 111 degrees C. (head temperature between 58 and 64 degrees C.) while a total of 115 milliliters of distillate is collected. Thereafter, heating is discontinued and the temperature of the contents of the vessel allowed to drop to ambient temperature. A total of 120 milliliters of distillate (including the 115 ml mentioned above) is collected during the course of the distillation.

The resulting product is an ungelled urethane resin composition of the invention. The urethane resin composition has a number average molecular weight of 798 and a weight average molecular weight of 2281 as determined by gel permeation chromatography using a polystyrene standard.

What is claimed is:

1. An ungelled urethane resin composition comprising a urethane compound having at least one group containing a silicon atom said group selected from:

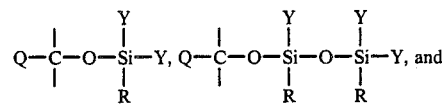

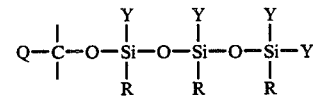

wherein

Q represents the residue from a urethane polyol, and each

R independently is selected from the group of moieties consisting of hydrogen and a $C_1$-$C_{10}$ group joined to Si through an Si—C linkage, and Y represents an easily hydrolyzable group;

provided that said urethane resin composition contains an amount of easily hydrolyzable Y moieties such that the ratio of the number of grams of said ungelled urethane resin composition to equivalents of easily hydrolyzable Y moieties in said ungelled urethane resin composition is in a range of from 40 to 667.

2. The ungelled urethane resin composition of claim 1 which is curable to a tack free state in the presence of atmospheric moisture and a catalyst at a temperature of less than or equal to 121 degrees C. within 3 hours.

3. The ungelled urethane resin composition of claim 1 which is curable to a tack free state in the presence of atmospheric moisture and a catalyst at a temperature of 24 degrees C. within 24 hours.

4. The ungelled urethane resin composition of claim 1 wherein at least a portion of the R moieties independently represent a $C_1$-$C_{10}$ group, joined to Si through an Si—C linkage, containing a primary amino group, a secondary amino group, a tertiary amino group, a polyamino group, a mercapto group, a urea group, a cyclic urea group, a urethane group, a 1,2-epoxy group, an ester group, an ether group, a thioether group, an amido group, an imidazolinyl group, a cyano group, an allyl group, a vinyl group, or a halo atom.

5. The ungelled urethane resin composition of claim 1 wherein each Y independently is selected from the group consisting of —OR$^1$,

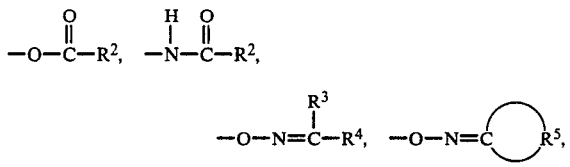

and the monohydroxy or cyclic C$_2$-C$_3$ residue of a 1,2- or 1,3-glycol, wherein
R$^1$ represents a C$_1$-C$_3$ alkyl
R$^2$ independently represents H or C$_1$-C$_4$ alkyl,
R$^3$ and R$^4$ independently represent H, C$_1$-C$_4$ alkyl, or C$_6$-C$_8$ aryl, and
R$^5$ represents C$_4$-C$_7$ alkylene.

6. The ungelled urethane resin composition of claim 1 wherein at least one Y is a methoxy group and at least one R is a C$_1$-C$_3$ group.

7. The urethane resin composition of claim 6 wherein R is selected from the group consisting of a methyl group and a vinyl group.

8. The ungelled urethane resin composition of claim 1 wherein said urethane polymer is a reaction product of said urethane polyol and an organosilicon-containing material comprising at least 10 percent by weight of said organosilicon-containing material of a compound corresponding to the formula R—Si(OR$^6$)$_3$ wherein
R independently represents hydrogen or a C$_1$-C$_{10}$ group joined to Si through an Si—C linkage, and
R$^6$ independently represents a C$_1$-C$_3$ alkyl group.

9. The ungelled urethane resin composition of claim 1 which is a reaction product of a urethane polyol and an organosilicon-containing material comprising at least 10 percent by weight of said organosilicon-containing material of a compound corresponding to the formula

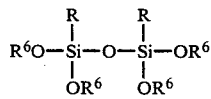

wherein
R independently represents hydrogen or a C$_1$-C$_{10}$ group joined to Si through an Si—C linkage, and
R$^6$ independently represents a C$_1$-C$_3$ alkyl group.

10. The ungelled urethane resin composition of claim 1 which is a reaction product of a urethane polyol and an organosilicon-containing material comprising at least 10 percent by weight of said organosilicon-containing material of a compound corresponding to the formula

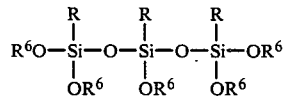

wherein
R independently represents hydrogen or a C$_1$-C$_{10}$ group joined to Si through an Si—C linkage, and
R$^6$ independently represents a C$_1$-C$_3$ alkyl group.

11. The ungelled urethane resin composition of claim 1 which is a reaction product of a urethane polyol and an organosilicon-containing material comprising a mixture containing at least 10 percent by weight of said organosilicon-containing material of a compound corresponding to the formula R—Si(OR$^6$)$_3$ and at least 10 percent by weight of said organosilicon-containing material of a compound corresponding to the formula

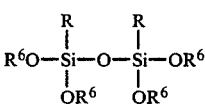

wherein
R independently represents hydrogen or a C$_1$-C$_{10}$ group joined to Si through an Si—C linkage, and
R$^6$ independently represents a C$_1$-C$_3$ alkyl group.

12. The ungelled urethane resin composition of claim 1 which is a reaction product of a urethane polyol and a partial hydrolysis product of a compound corresponding to the formula R—Si(OR$^6$)$_3$ wherein
R independently represents hydrogen or a C$_1$-C$_{10}$ group joined to Si through an Si—C linkage, and
R$^6$ independently represents a C$_1$-C$_3$ alkyl group.

13. The ungelled urethane resin composition of claim 11 wherein at least one OR$^6$ is a methoxy group and at least one R is selected from methyl or vinyl.

14. The ungelled urethane resin composition of claim 11 wherein said urethane polyol has a weight average molecular weight determined by gel permeation chromatography using a polystyrene standard of from 200 to 50,000.

15. The ungelled urethane resin composition of claim 11 wherein said urethane polyol has a hydroxyl equivalent weight of from 74 to 1,000.

16. A nonaqueous composition comprising: an ungelled urethane resin composition containing a urethane compound having at least one group containing a silicon atom said group selected from:

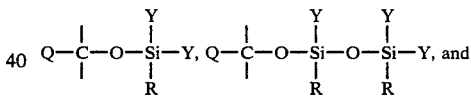

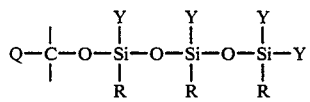

wherein
Q represents the residue from a urethane polyol, and each
R independently is selected from the group of moieties consisting of hydrogen and a C$_1$-C$_{10}$ group joined to Si through an Si—C linkage, and
Y represents an easily hydrolyzable group;
provided that the urethane resin composition contains an amount of easily hydrolyzable Y moieties such that the ratio of the number of grams of said ungelled urethane resin composition to equivalents of easily hydrolyzable Y moieties in said ungelled urethane resin composition is in a range of from 40 to 667.

17. The nonaqueous composition of claim 16 which is curable in the presence of atmospheric moisture and a catalyst at a temperature of less than or equal to 121 degrees C. within 3 hours.

18. The nonaqueous composition of claim 16 which is curable in the presence of atmospheric moisture and a catalyst at a temperature of 24 degrees C. within 24 hours.

19. The nonaqueous composition of claim 16 wherein at least a portion of the R moieties independently represent a $C_1$-$C_{10}$ group, joined to Si through an Si—C linkage, containing a primary amino group, a secondary amino group, a tertiary amino group, a polyamino group, a mercapto group, a urea group, a cyclic urea group, a urethane group, a 1,2-epoxy group, an ester group, an ether group, a thioether group, an amido group, an imidazolinyl group, a cyano group, an allyl group, a vinyl group, or a halo atom.

20. The nonaqueous composition of claim 16 wherein each easily hydrolyzable group Y of said urethane compound independently is selected from the group consisting of —OR$^1$,

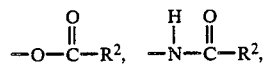

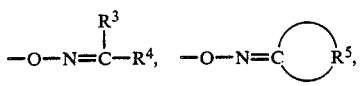

and the monohydroxy or cyclic $C_2$-$C_3$ residue of a 1,2- or 1,3-glycol, wherein R$^1$ represents a $C_1$-$C_3$ alkyl R$^2$ represents H or $C_1$-$C_4$ alkyl, R$^3$ and R$^4$ independently represent H, $C_1$-$C_4$ alkyl, or $C_6$-$C_8$ aryl, and R$^5$ represents $C_4$-$C_7$ alkylene.

21. The nonaqueous composition of claim 16 wherein at least one Y is a methoxy group and at least one R is methyl or vinyl.

22. The nonaqueous composition of claim 16 wherein said ungelled urethane resin composition is a reaction product of a urethane polyol and an organosilicon-containing material comprising a mixture containing at least 10 percent by weight of said organosilicon-containing material of a compound corresponding to the formula R—Si(OR$^6$)$_3$ and at least 10 percent by weight of said organosilicon-containing material of a compound corresponding to the formula

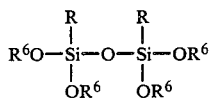

wherein

R independently represents hydrogen or a $C_1$-$C_{10}$ group joined to Si through an Si—C linkage, and R$^6$ independently represents a $C_1$-$C_3$ alkyl group.

23. A substrate having thereon a cured film comprising the nonaqueous composition of claim 16.

24. A substrate having thereof a cured film comprising the nonaqueous composition of claim 17.

25. A method of preparing an ungelled urethane resin composition, curable in the presence of atmospheric moisture and a catalyst at a temperature of less than or equal to 121 degrees C. by reacting components comprising:

(A) a urethane polyol; and (B) an organosilicon-containing material comprising at least 10 percent by weight of said organosilicon-containing material of a compound corresponding to the formula R—Si(OR$^6$)$_3$ wherein R independently represents hydrogen or a $C_1$-$C_{10}$ group joined to Si through an Si—C linkage, and R$^6$ independently represents a $C_1$-$C_3$ alkyl group.

26. The method of claim 25 wherein said organosilicon-containing material additionally comprises at least 10 percent by weight of said organosilicon-containing material of a compound corresponding to the formula

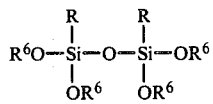

wherein

R independently represents hydrogen or a $C_1$-$C_{10}$ group joined to Si through an Si—C linkage, and R$^6$ independently represents a $C_1$-$C_3$ alkyl group.

27. The method of claim 25 wherein said organosilicon-containing material is a partial hydrolysis product of a compound corresponding to the formula R—Si(OR$^6$)$_3$ wherein R independently represents hydrogen or a $C_1$-$C_{10}$ group joined to Si through an Si—C linkage, and R$^6$ independently represents a $C_1$-$C_3$ alkyl group.

28. The nonaqueous coating composition of claim 16 additionally comprising an organic polyol wherein said ungelled urethane resin is a curing agent for said organic polyol.

29. The nonaqueous composition of claim 28 wherein said organic polyol is selected from the group consisting of: simple diols, triols and higher hydric alcohols; acrylic polyols; polyurethane polyols; polyester polyols, polyether polyols; amide-containing polyols; polyhydroxyl-functional epoxy resins; polyhyric polyvinyl alcohols; and mixtures thereof.

* * * * *

UNITED STATES PATENT AND TRADEMARK OFFICE
CERTIFICATE OF CORRECTION

PATENT NO. : 4,622,369

DATED : November 11, 1986

INVENTOR(S) : Wen-Hsuan Chang, et al

It is certified that error appears in the above-identified patent and that said Letters Patent is hereby corrected as shown below:

Column 25, line 23, claim 7: insert --ungelled-- before "urethane".

Signed and Sealed this

Third Day of November, 1987

*Attest:*

DONALD J. QUIGG

*Attesting Officer*   *Commissioner of Patents and Trademarks*